(12) United States Patent
Aghajanyan et al.

(10) Patent No.: US 10,963,644 B2
(45) Date of Patent: Mar. 30, 2021

(54) COMPUTER-IMPLEMENTED GENERATION AND UTILIZATION OF A UNIVERSAL ENCODER COMPONENT

(71) Applicant: Microsoft Technology Licensing, LLC, Redmond, WA (US)

(72) Inventors: Armen Aghajanyan, Bellevue, WA (US); Xia Song, Redmond, WA (US); Saurabh Kumar Tiwary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 16/234,491

(22) Filed: Dec. 27, 2018

(65) Prior Publication Data

US 2020/0210523 A1 Jul. 2, 2020

(51) Int. Cl.
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC ................................ G06F 40/30; G06N 20/00
USPC ........................................................... 704/9
See application file for complete search history.

(56) References Cited

U.S. PATENT DOCUMENTS

| 10,067,939 | B2* | 9/2018 | Na .......................... G06F 40/58 |
| 2015/0205783 | A1* | 7/2015 | Anisimovich .......... G06F 40/44 |
| | | | 704/2 |
| 2018/0129972 | A1* | 5/2018 | Chen ....................... G06N 3/063 |
| 2020/0097554 | A1* | 3/2020 | Rezagholizadeh ..... G06F 40/42 |

OTHER PUBLICATIONS

Zoph and Knight, "Multi-Source Neural Translation," Proceedings of NAACL-HLT 2016, pp. 30-34 (Year: 2016).*
Aghajanyan, et al., "Towards Language Agnostic Universal Representations," in Proceedings of the 57th Annual Meeting of the Association for Computational Linguistics, Jul. 2019, pp. 4033-4041.

(Continued)

*Primary Examiner* — Paras D Shah
*Assistant Examiner* — Nicole A Kotulak

(57) ABSTRACT

Computer-implemented techniques are described herein for generating and utilizing a universal encoder component (UEC). The UEC maps a linguistic expression in a natural language to a language-agnostic representation of the linguistic expression. The representation is said to be agnostic with respect to language because it captures semantic content that is largely independent of the syntactic rules associated with the natural language used to compose the linguistic expression. The representations is also agnostic with respect to task because a downstream training system can leverage it to produce different kinds to machine-trained components that serve different respective tasks. The UEC facilitates the generation of downstream machine-trained models by permitting a developer to train a model based on input examples expressed in a language $j_\alpha$, and thereafter apply it to the interpretation of documents in language $j_\beta$, with no additional training required.

18 Claims, 11 Drawing Sheets

(56) References Cited

OTHER PUBLICATIONS

Ahearn, Laura M., Living Language: An Introduction to Linguistic Anthropology, 2nd edition, John Wiley & Sons, 2016, abstract provided only, available at <<https://www.wiley.com/en-us/Living+Language%3A+An+Introduction+to+Linguistic+Anthropology%2C+2nd+Edition-p-9781119060604>>, accessed on Nov. 21, 2018, 3 pages.
Altarriba, Jeanette, "The Representation of Translation Equivalents in Bilingual Memory," in Cognitive Processing in Bilinguals, Elsevier, 1992, pp. 157-174.
Ammar, et al., "Massively Multilingual Word Embeddings," in arXiv:1602.01925v2 [cs.CL], May 21, 2016, 10 pages.
Arjovsky, et al., "Wasserstein GAN," in arXiv:1701.07875v3 [stat.ML], Dec. 6, 2017, 32 pages.
Artetxe, et al., "Unsupervised Neural Machine Translation," in arXiv:1710.11041v2 [cs.CL], Feb, 26, 2018, 12 pages.
Au, Terry Kit-Fong, "Chinese and English Counterfactuals: the Sapir-Whorl Hypothesis Revisited," in Cognition, vol. 15, Nos. 1-3, 1983, pp. 155-187, abstract provided only, available at <<https://www.sciencedirect.com/science/article/pii/0010027783900380>>, accessed on Dec. 7, 2018, 2 pages.
Bentin, et al., "Event-Related Potentials, Lexical Decision and Semantic Priming," in Electroencephalography and Clinical Neurophysiology, vol. 60, No. 4, 1985, pp. 343-355, abstract provided only, available at <<https://www.ncbi.nlm.nih.gov/pubmed/2579801>>, accessed on Dec. 7, 2018, 1 page.
Bowman, et al., "A Large Annotated Corpus for Learning Natural Language Inference," in arXiv:1508.05326v1 [cs.CL], Aug. 21, 2015, 11 pages.
Chen, et al., "Reading Wikipedia to Answer Open Domain Questions," in arXiv:1704.00051v2 [cs.CL], Apr. 28, 2017, 10 pages.
Chen, et al., "Unsupervised Multilingual Word Embeddings," in arXiv:1808.08933v2 [cs.CL], Sep. 6, 2018, 10 pages.
Chomsky, Noam, "Poverty of Stimulus: Unfinished Business," Transcript of a presentation given at Johannes-Gutenberg University, Mainz, 2010, 36 pages.
Chomsky, Noam, Aspects of the Theory of Syntax, MIT press, 2015, abstract provided only, available at <<https://mitpress.mit.edu/books/aspects-theory-syntax>>, accessed on Nov. 21, 2018, 3 pages.
Culicover, Peter W., Principles and Parameters: An Introduction to Syntactic Theory, Oxford University Press, 1997, abstract provided only, available at <<https://global.oup.com/academic/product/principles-and-parameters-9780198700142?q=Principles and parameters: An introduction to syntactic theory&lang=en&cc=us#>>, accessed on Nov. 21, 2018, 2 pages.
Dai, et al., "Semi-Supervised Sequence Learning," in arXiv:1511.01432v1 [cs.LG], Nov. 4, 2015, 10 pages.
Gal, et al., "A Theoretically Grounded Application of Dropout in Recurrent Neural Networks," in arXiv:1512.05287v5 [stat.ML], Oct. 5, 2016, 14 pages.
Gulrajani, et al., "Improved Training of Wasserstein GANS," in arXiv:1704.00028v3 [cs.LG], Dec. 25, 2017, 20 pages.
Hochreiter, et al, "Long Short-Term Memory," in Neural Computation, vol. 9, No. 8, 1997, 32 pages.
Kay, et al., "What Is the Sapir-Whorf Hypothesis?," in American Anthropologist, New Series, vol. 86, No. 1, Mar. 1984, pp. 65-79.
Ioffe, et al., "Batch Normalization: Accelerating Deep Network Training by Reducing Internal Covariate Shift," in arXiv:1502.03167v3 [cs.LG], Mar. 2, 2015, 11 pages.

<Kim, et al., "Semantic Sentence Matching with Densely-Connected Recurrent and Co-attentive Information," in arXiv:1805.11360v2, [cs.CL], Nov. 2, 2018, 11 pages.
<Kingma, et al., "Adam: A Method for Stochastic Optimization," in arXiv:1412.6980v9 [cs.LG], Jan. 30, 2017, 15 pages.
Klein, et al. "OpenNMT: Open-Source Toolkit for Neural Machine Translation," in arXiv:1701.02810v2 [cs.CL], Mar. 6, 2017, 6 pages.
Lewis, et al., "Learnability and the Statistical Structure of Language: Poverty of Stimulus Arguments Revisited," in Proceedings of the 26th Annual Conference on Language Development, 2001, 12 pages.
Maas, et al., "Learning Word Vectors for Sentiment Analysis," in Proceedings of the 49th Annual Meeting of the Association for Computational Linguistics: Human Language Technologies, 2011, pp. 142-150.
Van Der Maaten, et al., "Visualizing Data Using t-SNE," in Journal of Machine Learning Research, Nov. 9, 2008, pp. 2579-2605.
McCann, et al., "Learned in Translation: Contextualized Word Vectors," in Advances in Neural Information Processing Systems, Dec. 4, 2017, 12 pages.
Mesnil, et al., "Ensemble of Generative and Discriminative Techniques for Sentiment Analysis of Movie Reviews," in arXiv:1412.5335v7 [cs.CL], May 27, 2015, 5 pages.
Mitchel, Aaron, "Do Bilinguals Access a Shared or Separate Conceptual Store? Creating False Memories in a Mixed-Language Paradigm," available at <<https://digitalcommons.macalester.edu.cgi/viewcontent.cgi?article=1000&context=psychology_honors>>, Psychology Honors Projects, Paper 1, 2005, 50 pages.
"Universal Grammar," available at <<https://en.wikipedia.org/wiki/Universal_grammar>>, Wikipedia article, accessed on Dec. 7, 2018, 8 pages.
Peters, et al., "Deep Contextualized Word Representations," in arXiv:1802.05365v2 [cs.CL], Mar. 22, 2018, 15 pages.
Radford, et al., "Learning to Generate Reviews and Discovering Sentiment," in arXiv:1704.01444v2 [cs.LG], Apr. 6, 2017, 9 pages.
Schwenk, et al., "Learning Joint Multilingual Sentence Representations with Neural Machine Translation," in arXiv:1704.04154v2 [cs.CL], Aug. 8, 2017, 11 pages.
Sennrich, et al., "Neural Machine Translation of Rare Words with Subword Units," in arXiv:1508.07909v5 [cs.CL], Jun. 10, 2016, 11 pages.
Tan, et al., "Multiway Attention Networks for Modeling Sentence Pairs," in Proceedings of the Twenty-Seventh International Joint Conference on Artificial Intelligence (IJCAI-18), Jul. 2018, pp. 4411-4417.
Tan, et al., "An Empirical Study of Sentiment Analysis for Chinese Documents," in Expert Systems with Applications, vol. 34, No. 4, 2007, 8 pages.
"Linguistic Relativity," available at <<https://en.wikipedia.org/wiki/Linguistic_relativity>>, Wikipedia article, accessed on Dec. 7, 2018, 21 pages.
Koerner, E. F. Konrad, "The Sapir-Whorf Hypothesis: A Preliminary History and a Bibliographical Essay," in Journal of Linguistic Anthropology, vol. 2, No. 2, Dec. 1992, pp. 173-198.
Cui, et al., "Deep Stacked Bidirectional and Unidirectional LSTM Recurrent Neural Network for Network-Wide Traffic Speed Prediction," in arXiv:1801.02143 [cs.LG], Jan. 7, 2018, 12 pages.
Aghajanyan, et al., "Toward Language Agnostic Universal Representations," in arXiv:1809.08510v1 [cs.CL], Sep. 23, 2018, 10 pages.

* cited by examiner

OVERVIEW OF THE USE OF A UNIVERSAL CONVERSION COMPONENT 802

RECEIVE A UNIVERSAL ENCODER COMPONENT THAT IS PRODUCED BY A FIRST COMPUTER-IMPLEMENTED TRAINING SYSTEM.
804

USE A SECOND COMPUTER-IMPLEMENTED TRAINING SYSTEM TO GENERATE A TASK-SPECIFIC MACHINE-TRAINED COMPONENT BASED ON A SET OF INPUT TRAINING EXAMPLES EXPRESSED IN AT LEAST ONE NATURAL LANGUAGE, THE SECOND TRAINING SYSTEM USING THE UNIVERSAL ENCODER COMPONENT TO CONVERT EACH INPUT TRAINING EXAMPLE INTO A LANGUAGE-AGNOSTIC REPRESENTATION OF THE INPUT TRAINING EXAMPLE. THE TASK-SPECIFIC MACHINE-TRAINED COMPONENT, ONCE TRAINED, PROVIDES A COMPUTER-IMPLEMENTED TOOL FOR MAPPING AN INPUT DOCUMENT, EXPRESSED IN AN INPUT NATURAL LANGUAGE, INTO AN OUTPUT RESULT. THE MAPPING ALSO APPLIES TO A CASE IN WHICH THE INPUT NATURAL LANGUAGE OF THE INPUT DOCUMENT IS NOT AMONG THE AT LEAST ONE NATURAL LANGUAGE THAT WAS USED TO PRODUCE THE TASK-SPECIFIC MACHINE-TRAINED COMPONENT. THE SECOND TRAINING SYSTEM CORRESPONDS TO A DIFFERENT TRAINING SYSTEM OR A SAME TRAINING SYSTEM AS THE FIRST TRAINING SYSTEM.
806

FIG. 8

OVERVIEW OF THE TRAINING OF THE UNIVERSAL ENCODER COMPONENT 1002

USE PLURAL LANGUAGE-SPECIFIC ENCODER COMPONENTS TO CONVERT INPUT TRAINING EXAMPLES EXPRESSED IN DIFFERENT NATURAL LANGUAGES INTO RESPECTIVE LANGUAGE-SPECIFIC REPRESENTATIONS OF THE INPUT TRAINING EXAMPLES.
1004

USE A LANGUAGE-AGNOSTIC ENCODER COMPONENT TO CONVERT EACH LANGUAGE-SPECIFIC REPRESENTATION INTO A LANGUAGE-AGNOSTIC REPRESENTATION.
1006

FOR EACH NATURAL LANGUAGE ASSOCIATED WITH THE INPUT TRAINING EXAMPLES, USE A LANGUAGE-SPECIFIC DECODER COMPONENT TO CONVERT THE LANGUAGE-AGNOSTIC REPRESENTATION, TOGETHER WITH RULE INFORMATION WHICH CHARACTERIZES SYNTACTIC PRINCIPLES UNDERLYING THE NATURAL LANGUAGE, INTO A LANGUAGE-SPECIFIC DECODED REPRESENTATION.
1008

FOR EACH NATURAL LANGUAGE ASSOCIATED WITH THE INPUT TRAINING EXAMPLES, USE A LANGUAGE-SPECIFIC OUTPUT COMPONENT TO CONVERT THE LANGUAGE-SPECIFIC DECODED REPRESENTATION INTO AN OUTPUT RESULT EXPRESSED IN THE NATURAL LANGUAGE.
1010

GENERATE FIRST LOSS INFORMATION BASED ON A MEASURE OF PREDICTIVE ACCURACY OF THE LANGUAGE MODEL COMPONENT.
1012

COMPUTER-IMPLEMENTED GENERATION AND UTILIZATION OF A UNIVERSAL ENCODER COMPONENT

BACKGROUND

Application developers are increasingly making use of machine-trained models. In many of these applications, a model receives input information in a natural language and provides an output result that represents the outcome of some kind of analysis that the model has performed on the input information. For example, an application may use a machine-trained model to map a document expressed in a natural language to an output result that identifies the sentiment(s) expressed in the document.

In a typical training procedure, a computing system generates a model in a language-specific manner and task-specific manner. That is, the computing system iteratively learns the weight values of the model based on a corpus of training documents expressed in a single natural language, such as English or French. The computing system is said to be task-specific because it generates the machine-trained model to serve a specific purpose (such as sentiment analysis).

The model produced in the above manner will provide good performance with respect to the language that it was trained to serve, but will typically perform in an unsatisfactory manner for other natural languages. Some model developers have addressed this issue by producing a model based on a multilingual corpus of training examples. But this strategy increases the complexity of the training process. Moreover, a model developer may not have training examples readily available in multiple natural languages. These deficiencies are not easily remedied: generating a corpus in a desired natural language may represent a time-consuming, labor-intensive, and resource-expensive task. Finally, because the machine-trained model is designed to serve a specific single task, any insight it may capture cannot be utilized in service of other tasks.

SUMMARY

Computer-implemented techniques are described herein for generating and utilizing a universal encoder component (UEC). The UEC maps a linguistic expression in a natural language to a language-agnostic representation of the linguistic expression. The representation is said to be agnostic with respect to language because it captures semantic content that is largely independent of the syntactic rules associated with the natural language used to compose the linguistic expression. The representation is also agnostic with respect to task because a downstream training system can leverage it to produce different kinds to machine-trained components that serve different respective tasks.

According to one illustrative aspect, the training system produces the UEC by simultaneously training a language model component and a discriminator component. The training system performs this task based on a training objective that takes into consideration at least: loss information based on a measure of predictive accuracy of the language model component; and loss information based on a measure of coherence among language-agnostic representations of input training examples expressed in different natural languages. The measure of coherence is based on output information generated by the discriminator component.

According to another illustrative aspect, a downstream training system can leverage the UEC to produce a task-specific machine-trained component based on a corpus of input training examples in one or more languages. The task-specific machine-trained component can thereafter be used to interpret input documents expressed in natural languages other than those represented by the training corpus. For example, a downstream training system can develop a machine-trained sentiment analysis component based on a corpus of English documents. A user may thereafter apply the sentiment analysis component to interpret Russian-language documents without any additional training.

The above-summarized techniques are beneficial because they facilitate the generation of task-specific machine-trained components. The techniques are particularly valuable in those cases in which a developer wishes to develop a machine-trained model to assist speakers of a particular natural language, but lacks a suitable corpus of training examples expressed in that natural language. The techniques also make efficient use of computing resources. For instance, the techniques simplify downstream training operations by eliminating the need to generate separate machine-trained models to serve different natural languages.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 shows a process for producing a task-specific machine-trained component using the UEC.

FIGS. 10-11 show a process for producing the UEC.

Figure 1:
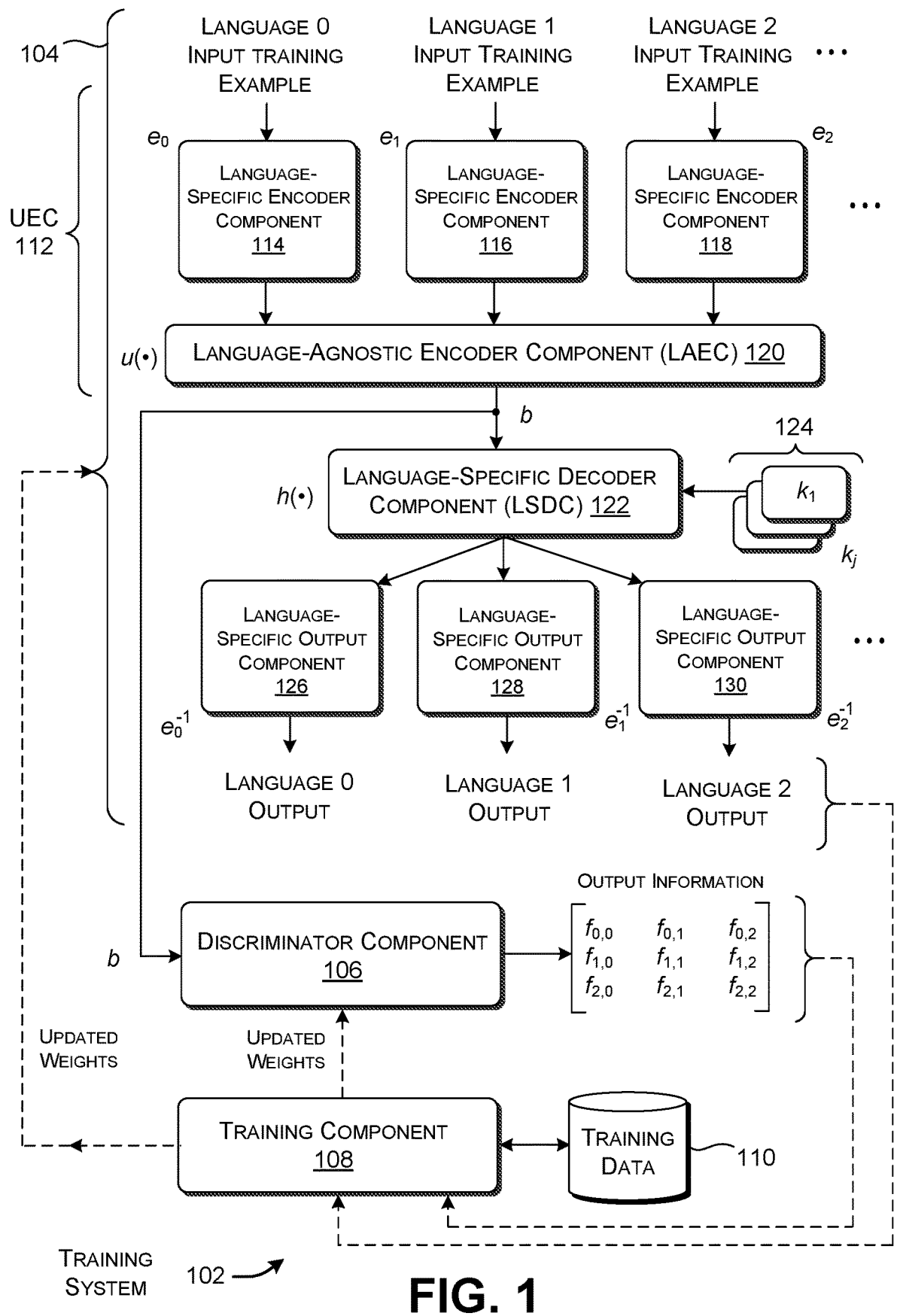
FIG. 1 shows an illustrative training system for training a universal encoder component (UEC).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes computing systems for generating and utilizing a universal encoder component (UEC). Section B sets forth illustrative methods which explain the operation of the computing systems of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computer-Implemented Training Systems

FIG. 1 shows a training system 102 for producing a universal encoder component (UEC). The UEC converts a linguistic expression in a natural language into a language-agnostic form. A representation is said to be agnostic with respect to language when it is largely independent of the syntactic principles used to structure information in different natural languages.

In one non-limiting implementation, the training system 102 uses a generative adversarial network (GAN) to produce the UEC. In a first path of analysis, the GAN uses a language model component 104 which maps a set of input training examples expressed in different natural languages into respective language-agnostic representations of those input training examples. The language model component 104 then converts the language-agnostic representations into a set of predictive output results expressed in the same natural languages. For example, the language model component 104 converts an English-language input phrase (such as the phrase, "A large part of the") into a language-agnostic representation of that input phrase, and then converts that language-agnostic representation into an output result which predicts a next English word which will follow the input phrase (such as the word "evidence").

In a separate path of analysis, a discriminator component 106 generates output information which can be used to assess an extent of coherence among different language-agnostic representations originating from different input training examples expressed in different natural languages. For example, the discriminator component 106 can generate first output information for a language-agnostic representation of an English-language training example, and second output information for a language-agnostic representation of a Chinese-language training example. The training system 102 can then generate a distance measure based on the first and second instances of output information which reflects the extent of similarity between the two language-agnostic representations. As will be described below in greater detail, the training system 102 can specifically use a Wasserstein (earth mover) distance measure to perform this task.

A training component 108 iteratively trains the GAN based on a set of training examples in a data store 110. More specifically, the training component 108 generates first loss information based on the predictive accuracy of the language model component 104. It generates second loss information based on the output information generated by the discriminator component 106. It then updates weighting values used by the language model component 104 and the discriminator component 106 based on the first loss information and second loss information, respectively. It repeats these operations a plurality of times until a prescribed degree of convergence is achieved. In practice, the training component 108 may update the discriminator component 106 at a rate r, and the language model component 104 at a rate s, where r>s.

In the course of the above-described training operation, the training component 108 iteratively improves the predictive accuracy of the language model component 104. Simultaneously, the training component 108 improves the ability of the discriminator component 108 to identify the coherence among language-agnostic representations that originate from different natural languages. Altogether, the training component 108 trains the language model component 104 subject to the constraint imposed by the discriminator component 106. That constraint incentivizes coherence among language-agnostic representations originating from input training examples expressed in different natural languages. The GAN is said to be adversarial because the language model component 104 and the discriminator component 106 are pitted against each other; as each component improves, it makes the job of the other component more difficult to perform.

The training component 108 produces a universal encoder component (UEC) 112 as an outcome of its training. As shown in FIG. 1, the UEC 112 corresponds to those components of the language model component 104 which produce the language-agnostic representation.

The GAN will now be described in generally top-down manner. Additional illustrative detail regarding the individual components of the training system 102 will be described below with respect to FIGS. 4, 5 and 7. Generally note that FIG. 1 illustrates the training system 102 in the context of the processing of three input training examples, to produce a set of three predictive output results. But the training system 102 can more generally be applied to the processing of a set of input training examples of any size v, where v≥2.

The language model component 104 includes a set of language-specific encoder components (114, 116, 118) for converting input training examples expressed in different natural languages into respective language-specific representations. Each input training example corresponds to a linguistic expression of any size and type having at least two words. For example, in a particular training operation, the training component 108 can feed an English language Wikipedia document into the first language-specific encoder component 114, a French language Wikipedia document into the second language-specific encoder component 116, and a Chinese language Wikipedia document into the third language-specific encoder component 118. These three documents can discuss any three topics, meaning that they need not represent translations of the same underlying content into three respective languages. In other words, these three documents need not originate from a parallel corpus of training examples. But in one implementation, the training component 108 chooses a set of documents that have approximately the same size (i.e., the same number of words).

In one implementation, each language-specific input component first maps the words in the input training example into embeddings using a pre-generated lookup table. Each language-specific input component then maps the embeddings into a language-specific representation of the training example. It performs this task using a machine-trained model. A language-agnostic encoder component (LAEC) 120 then maps the language-specific representations provided by the language-specific encoder components (114, 116, 118) into language-agnostic representations of the set of input training examples. The LAEC 120 performs this task using another machine-trained model.

More specifically, in one case, the training component 108 feeds the three input training examples into the respective language-specific encoder components (114, 116, 118) in series to produce three language-specific representations, e.g., by feeding the English input example first, the French training example second, and the Chinese input example third. The LAEC 120 can assemble the three language-specific representations into a set of language-specific representations, and then process that set of representations. In other case, the training component 108 feeds the three input training examples into the respective language-specific encoder components (114, 116, 118) at the same time to produce the three language-specific representations.

Next, a language-specific decoder component (LSDC) 122 formulates a language-specific decoded representation of each natural language associated with the set of input training examples. The LSDC 122 performs this task for each language j by first retrieving rule information $k_j$ which parametrically describes the syntactic rules by which linguistic expressions are formulated in the language j. For example, the rule information $k_j$ can include one or more parameter values which specify the ordering of words in a sentence in the language j. For instance, the rule information $k_j$ can indicate whether a verb follows a subject in the language j, or vice versa. Overall, the training system 102 can include a set 124 of rule information instances, e.g., each of which may be expressed as a vector of size q of parameter values. The LSDC 122 also receives the language-agnostic representation generated by the LAEC 120. The LSDC 122 then generates the language-specific decoded representation for each language j by concatenating the language-agnostic representation with the rule information $k_j$, and then mapping that concatenation into the language-specific decoded representation, using a machine-trained model.

In a final stage, a set of language-specific output components (126, 128, 130) perform the predictive function of the language model component 104. They do this by converting the different language-specific decoded representations provided by the LSDC 122 into a set of predictive output results in the respective natural languages (e.g., English, French, Chinese, etc.). For example, each language-specific output component can generate an output result which provides a prediction of a next word that will follow the corresponding input training example. In one implementation, each language-specific output component uses a machine-trained model to map a language-specific decoded representation into an intermediary output result. It then multiplies the intermediary output result by the transpose of the embedding table used by the counterpart language-specific encoder component. This yields the output result of the language-specific output component.

In a separate discriminator path, the discriminator component 106 uses another machine-trained model to map the language-agnostic representations provided by the LAEC 120 into output information. The training component 108 uses the output information to compute a distance between each pair of language-agnostic representations, associated with different input languages. Generally, each such pair includes a first input language $j_\alpha$ and a second input language $j_\beta$. In the context of processing English, French, and Chinese input training examples, the discriminator component 106 generates output information from which the training component 108 can compute the distance between each of the following pairs language-agnostic representations: (1) English and English; (2) English and French; (3) English and Chinese; (4) French and English; (5) French and French; (6) French and Chinese; (7) Chinese and English; (8) Chinese and French; and (9) Chinese and Chinese. This set of pairs is symmetric in the sense, for instance, that the output information for the pair {English, French} is equivalent to the output information for the pair {French, English}. FIG. 1 represents the function which generates output information for each such pair of output languages $(j_\alpha, j_\beta)$ as $f_{\alpha,\beta}$.

In other implementations, the training system 102 can use some other machine-training architecture besides a GAN. In general, the training system 102 involves learning the language model component 104 subject to the above-described language-to-language distance-related constraint. That constraint forces the training component 108 to capture the language-agnostic aspects of a set of input languages.

The operation of the language model component 104 can be mathematically expressed as follows. To begin with, the LAEC 120 performs a function u that produces a language-agnostic representation b, as given by:

$$b = u \circ e_j(w_0^j, w_1^j, \ldots, w_i^j) \quad (1).$$

The function $e_j$ represents the transformation performed by each language-specific input component for language j, with respect to a set of i words $(w_0^j, w_1^j, \ldots, w_i^j)$ of an input training example. More specifically, in one non-limiting case, the function $e_j$ maps a set of i integers representing tokens (e.g., words) into a set of i language-specific word vectors, each of size g. The function u maps this set of word vectors into the language-agnostic representation b of the input training example in the language j, itself representing a set of i vectors, each of size g.

The LSDC 122 receives the language-agnostic representation b from the LAEC 120 and an instance of rule information $k_j$ for the input language j (of size q). Per a function h, the LSDC 122 then maps this input information into a language-specific decoded representation for the language j, corresponding to a set of i vectors, each of size g.

Each language-specific output component for the language j then executes a predictive function $e_j^{-1}$ on the language-specific decoded representation to yield a language-specific output result for the language j. (Here, the superscript of −1 indicates that each language-specific output component performs the inverse of the operation associated with its counterpart language-specific encoder component, e.g., by mapping vector information back into token space.) The output result specifies the probability of a predicted word $w_i^j$ in the language j, given a set of preceding words in the input training example, expressed as $p_j(w_i^j | w_0^j, w_1^j, \ldots, w_{i-1}^j)$.

Overall, the operation of the language model component 104, for each language j, is given by:

$$p_j(w_i^j | w_0^j, w_1^j, \ldots, w_{i-1}^j) = e_j^{-1}(h(b, k_j)) \quad (2).$$

Now referring to the discriminator path, the training component 108 computes the distance between each respective pair of languages $(j_\alpha, j_\beta)$, as expressed mathematically by:

$$d(p(b|j_\alpha) \| p(b|j_\beta)) \quad (3).$$

More specifically, $p(b|j_\alpha)$ specifies the probability of the language-agnostic representation b, given the language $j_\alpha$, while $p(b|bj_\beta)$ represents the probability of the language-agnostic representation b, given the language $j_\beta$. Equation (3) overall expresses the distance d between these two representations. In one implementation, the training component 108 computes the distance d as a Wasserstein ($W_1$) distance, also known as the earth mover distance. A Wasserstein distance may be conceptualized as the lowest net cost that it takes to piecewise-transform a first probability distribution into a second probability distribution. The training component 108 stipulates that, given two languages $j_\alpha$ and $j_\beta$, the distribution of the universal representations should be within ε with respect to the $W_1$ of each other.

Equation (3) can be expressed as follows using the Kantarovich-Rubenstein duality:

$$\sup_{\|f_{\alpha,\beta}\|_L \leq 1} \mathbb{E}_{x \sim p(b|j_\alpha)}[f_{\alpha,\beta}(x)] - \mathbb{E}_{x \sim p(b|j_\beta)}[f_{\alpha,\beta}(x)]. \quad (4)$$

The symbol $f_{\alpha,\beta}(x)$ represents a function, for languages $j_\alpha$ and $j_\beta$, to be learned by the discriminator component 106 over the course of the training operation. The first term of Equation (4) represents the output of the function f for the case in which an input value x represents the probability distribution $p(b|j_\alpha)$. The second term in Equation (4) represents the output of function f for the case in which the input value x represents the probability distribution $p(b|j_\beta)$. Overall, the "sup" (suprema) notation of Equation (4) indicates that the training component 108 iteratively approximates the function $f_{\alpha,\beta}(x)$ so as to maximize the difference between the first and second terms of the equation. The subscript $\|f_{\alpha,\beta}\|_{L \leq 1}$ specifies that the Lipschitz constant (L) of f should be less than or equal to 1, which the training system 102 satisfies by clamping its parameter values to a compact space.

Overall, for the case of m input languages and N input training examples, each having n words, the training component 108 governs its training based on the following loss function:

$$\max_\theta \sum_{\alpha=0}^{m} \sum_{i=0}^{N} \log p_{j_\alpha}(w_{i,0}^\alpha, \ldots, w_{i,n}^\alpha; \theta) - \frac{\lambda}{m^2} \sum_{\alpha=0}^{m} \sum_{\beta=0}^{m} d(p(b|j_\alpha) \| p(b|j_\beta)). \quad (5)$$

The top half of Equation (5) represents an attempt to maximize the accuracy of predictions generated by the language model component 104, through iterative refinement of its parameter values θ. This part of the loss function references a probability $p_\alpha$ given by:

$$p(w_0, \ldots, w_n) = \prod_{i=1}^{n} p(w_i | w_0, \ldots, w_{i-1}). \quad (6)$$

Equation (6) indicates that a probability measure for a document having a series of words is reflected by the product of the probabilities associated with each of its words. Equation (6) expresses the probability of each word, in turn, in a conditional manner based on a set of words that precede it. As shown in FIG. 1, the training component 108 computes the first part of the loss function based on the output results provided by language-specific output components (126, 128, 130).

The bottom part of Equation (5) represents an attempt to minimize the differences between the pairs of language-agnostic representations of documents. The training component 108 can compute the distance measure d in Equation (5) as a Wassertein distance measure, formulated using Equation (4). The symbol $\lambda$ is a scaling factor that determines the impact of the second part of Equation (5) in the training operation. By setting $\lambda=0$, the training system 102 entirely ignores the constraint imposed by the discriminator component 106. As shown in FIG. 1, the training component 108 computes the bottom part of the loss function based on output information generated by the discriminator component 106. More specifically, the discriminator component 106 supplies the values used for the distance calculation of Equation (4).

Figure 2:
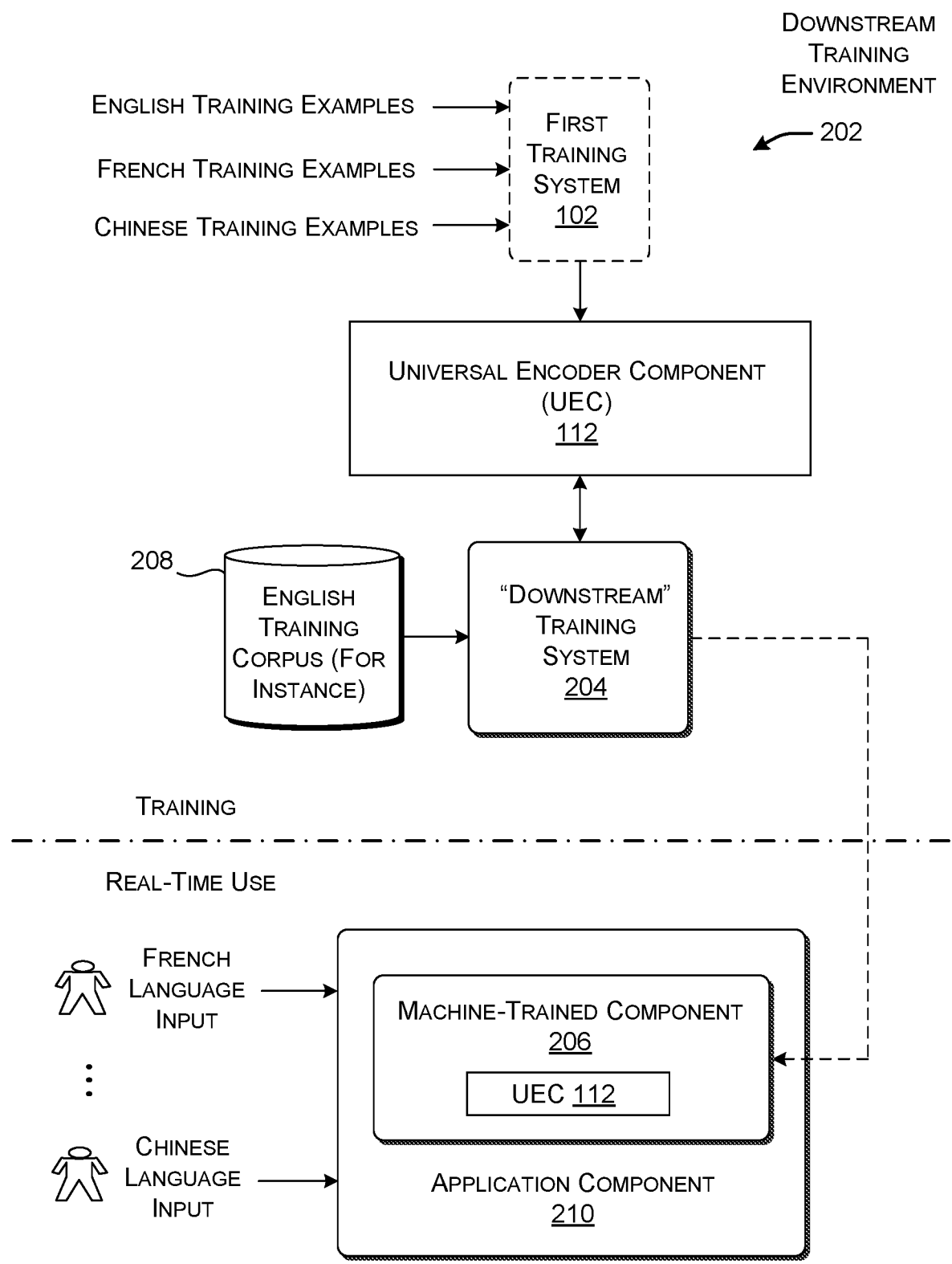
FIG. 2 shows an illustrative training system for training a downstream task-specific machine-trained component using the UEC.

Now turning to FIG. 2, this figure shows a downstream training environment 202 which makes use of the analysis performed by the training system 102 of FIG. 1. More specifically, the first training system 102 of FIG. 1 first produces the universal encoder component (UEC) 112. Once fully trained, the UEC 112 operates by mapping an input document in a natural language into a language-agnostic version of that input document. More specifically, in one case, the UEC 112 uses a machine-learned component which maps the words in the input document into their language-agnostic representations. With reference to FIG. 1, the machine-learned component includes one or more of the language-specific encoder components (114, 116, 118) and the LAEC 120. In another case, the UEC 112 can use an embedding table. The UEC 112 produces a language-agnostic version of the input document by using the table to convert words in the input document into their language-agnostic representations. The vectors in the table are generated in an offline manner using a machine-learned component.

A downstream training system 204 utilizes the UEC 112 to produce a task-specific machine-trained component 206. In one non-limiting implementation, assume that the downstream training system 204 specifically generates the task-specific machine-trained component 206 based on a corpus of English-language training examples in a data store 208. In doing so, the downstream training system 204 utilizes the UEC 112 to first convert the tokens (e.g., words) of the training examples into language-agnostic representations. The downstream training system 204 then trains the task-specific machine-trained component 206 by operating on these language-agnostic representations of the input training examples. The downstream training system 204 also incorporates the UEC 112 itself into the task-specific machine-trained component 206.

In the real-time phase of operation, assume that an application component 210 utilizes the task-specific machine-trained component 206 to perform some service to one or more users. Further assume that the application component 210 accepts input documents in a plurality of natural languages (French, Chinese, etc.), not limited to the single natural language (English) that was used to train the task-specific machine-trained component 206. The UEC 112 will convert each such input document into a language-agnostic representation, and then perform its task-specific analysis on "top" of the language-agnostic representation.

To cite merely one illustrative case, the task-specific machine-trained component 206 produced by the downstream training system 204 can analyze the sentiment expressed by an input document. For example, the task-specific machine-trained component 206 can be implemented as an n-layer Recurrent Neural Network (RNN) component in combination with a logistic regression layer. The logistic regression layer maps an output signal provided by the RNN component into a classification result. The classification result specifies the sentiment expressed by the input document. In this case, the UEC 112 feeds a language-agnostic representation of the input document into the RNN component.

The use of the UEC 112 facilitates the generation of the task-specific machine-trained component 206. That is, by using the UEC 112, the developer need not specifically train the task-specific machine-trained component 206 for a particular language $j_\alpha$, so long as the UEC 112 is capable of transforming input documents in that language into a language-agnostic form. This avoids the need for a model developer to create a training corpus for the language $j_\alpha$. It also eliminates the use of computing resources that would otherwise be required to generate and act on this training corpus.

Figure 3:
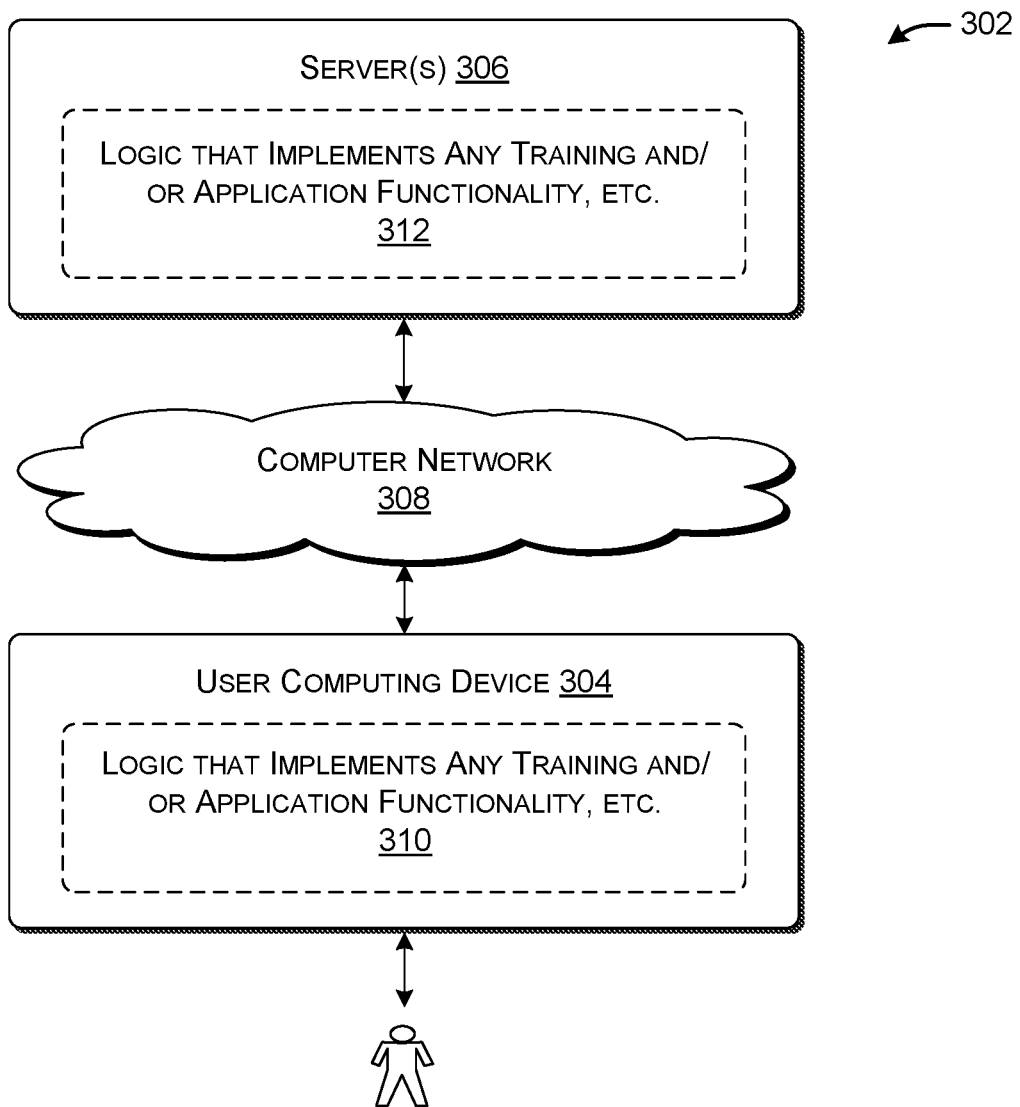
FIG. 3 shows computing equipment for implementing the training functionality shown in FIGS. 1 and 2.

FIG. 3 shows computing equipment 302 that can be used to implement any of the functionality described in FIGS. 1 and 2. The computing equipment 302 includes a user computing device 304 coupled to one or more remote servers 306 via a computer network 308. The user computing device 304 can include any of a desktop computing device, a portable computing device of any type (e.g., a smartphone, a tablet-type computing device, etc.), a game console, a wearable computing device, etc. The computer network 308 can correspond to a local area network, a wide area network (e.g., the Internet), one or more point-to-point links, etc.

FIG. 3 also indicates that the user computing device 304 can include logic 310 which implements any aspect of the functionality shown in FIGS. 1 and 2. Likewise, the server(s) 306 can include logic 312 which implements any aspect of the functionality described in FIGS. 1 and 2. For example, in one case, all of the functionality shown in FIGS. 1 and 2 is implemented by the sever(s) 306. A user may interact with this functionality via the user computing device 304, e.g., using a browser program provided by the user computing device 304. In another case, all of the functionality shown in FIGS. 1 and 2 is implemented by the user computing device 304. In another case, the functionality shown in FIGS. 1 and 2 is distributed between the server(s) 306 and the user computing device 304. For example, the server(s) 306 can implement all training aspects of the functionality shown in FIGS. 1 and 2. The user computing device 304 can implement at least part of the application component 210 shown in FIG. 2.

Figure 4:
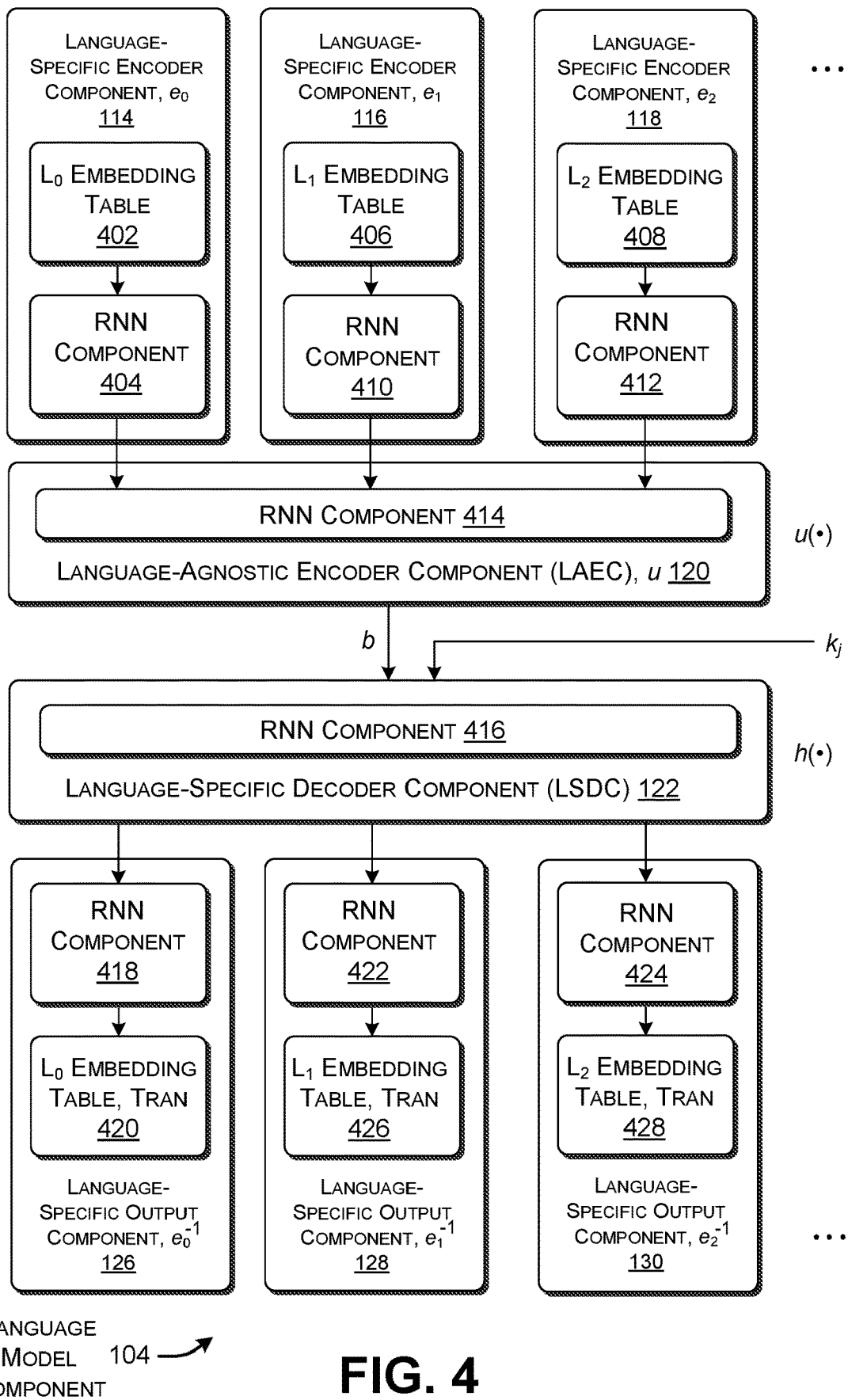
FIG. 4 shows one implementation of a language model component used by the training system of FIG. 1.

FIG. 4 shows one implementation of the language model component 104 shown in FIG. 1. Describing the language model component 104 from top to bottom, a first language-specific encoder component 114 converts an input training example in a first language ($j_0$) to a language-specific representation. To perform this task, the first language-specific encoder component 114 uses a pre-generated embedding table 402 to map each token (e.g., word) in the input training example into an embedding vector. The first language-specific encoder component 114 performs this task using a lookup operation. Any technique can be used to generate the embedding table 402 in an offline manner, such as using a neural network to map one-hot vectors or n-gram vectors associated with individual words into word embedding vectors. An n-layer RNN component 404 then converts each embedding vector into a language-specific output vector. The second language-specific encoder component 116 and the third language-specific encoder component 118 include respective embedding tables (406, 408) and respective RNN components (410, 412) that perform the same functions as the same-named components of the first language-specific encoder component 114.

In one implementation, the LAEC 120 includes its own n-layer RNN component 414. The RNN component 404 maps a set of output vectors provided by the language-specific encoder components (114, 116, 118) into the language-agnostic representation b. The language-agnostic representation b itself is made up of a plurality of language-agnostic output vectors.

The LSDC 122 concatenates the language-agnostic representation b with an instance of rule information $k_j$ associated with a specified language j, to produce input information. An n-layer RNN component 416 then maps the input information into a language-specific decoded representation. In one implementation, the LSDC 122 performs this operation in series for each language j. In another implementation, the LSDC 122 perform this operation in parallel for all of the languages represented by the set of input training examples.

The first language-specific output component 126 includes an RNN component 418 that maps a language-specific decoded representation for language $j_0$ into an intermediary result. The first language-specific output component 126 then multiplies the intermediary result by an embedding table 420; that embedding table 420, in turn, represents the transpose of the counterpart embedding table 402 of the first language-specific encoder component 114. This operation yields an output result, corresponding to a prediction of next word that will follow the input training example for language $j_0$. The second language-specific output component 128 and the third language-specific output component 130 include respective n-layer RNN components (422, 424) and embedding tables (426, 428) that perform the same functions as the same-named components of the first language-specific output component 126.

Figure 5:
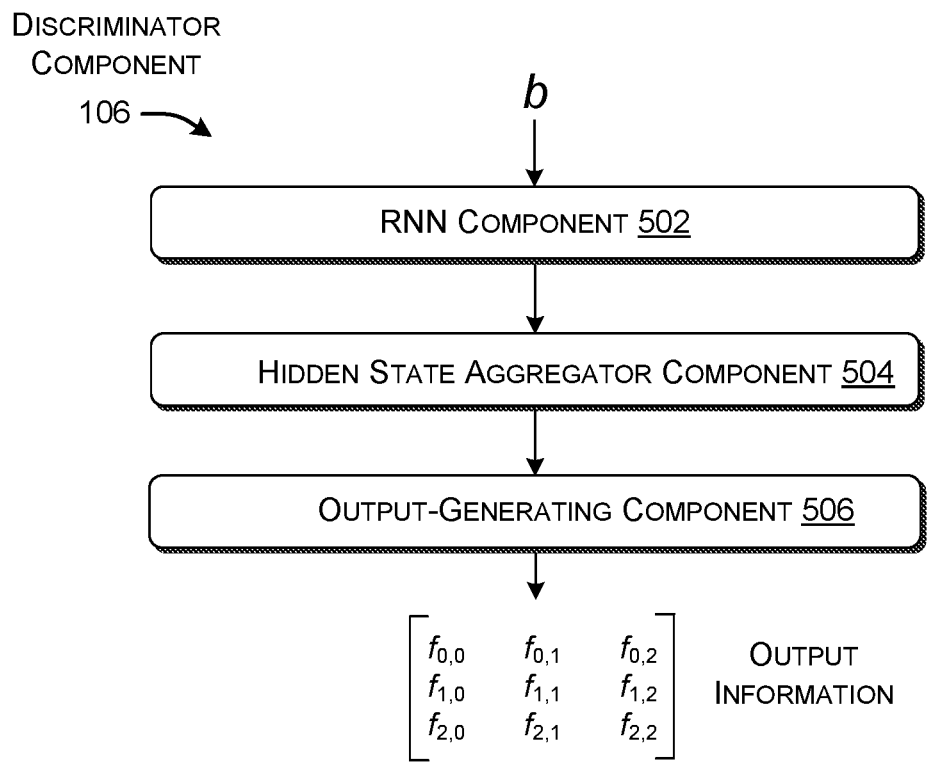
FIG. 5 shows one implementation of a discriminator component used in the training system of FIG. 1.

FIG. 5 shows one non-limiting implementation of the discriminator component 106. An n-layer RNN component 502 first maps the vectors of the language-agnostic representation b for each input training example into a plurality of hidden state vectors $h_i$. A hidden state aggregator component 504 then maps the hidden state vectors $h_i$ into a single hidden state vector h, per the equation, $h=\Sigma_i a_i h_i$. The symbol $a_i$ expresses a degree of emphasis given to each individual hidden state vector $h_i$, and is given by the equation:

$$a_i = \frac{\exp(w \cdot h_i)}{\Sigma_{i'} \exp(w \cdot h_{i'})}. \qquad (7)$$

In this equation, w represents a machine-learned weighting vector.

An output-generating component 506 maps the output of the hidden state aggregator component 504 into output information for each pairing of input languages ($j_\alpha, j_\beta$). More specifically, the output-generating component 506 provides the values that the training component 108 uses to compute the Wasserstein distance for each pairing of input languages ($j_\alpha, j_\beta$), per Equation (4). In one implementation, the output-generating component 506 can perform the above-described mapping operation using a machine-trained neural network that executes a linear transformation on the output of the hidden state aggregator component 504. That is, that neural network maps the output of the hidden state aggregator component 504 to an output vector, in which different dimensions of the output vector correspond to input values for input to Equation (4).

Optionally, the output-generating component 506 can also normalize the output information it generates for a batch of input training examples, e.g., by normalizing each output value $x_i$ by:

$$x'_i = \frac{x_i - \mu_B}{\sqrt{\sigma_B^2 + \epsilon}}. \qquad (8)$$

In this Equation, $x'_i$ represents the normalized version of output value $x_i$, $\mu_B$ represents the mean value of the output values over a batch B, $\sigma_B$ represents the variance over the batch B, and ε represents an error value.

Figure 7:
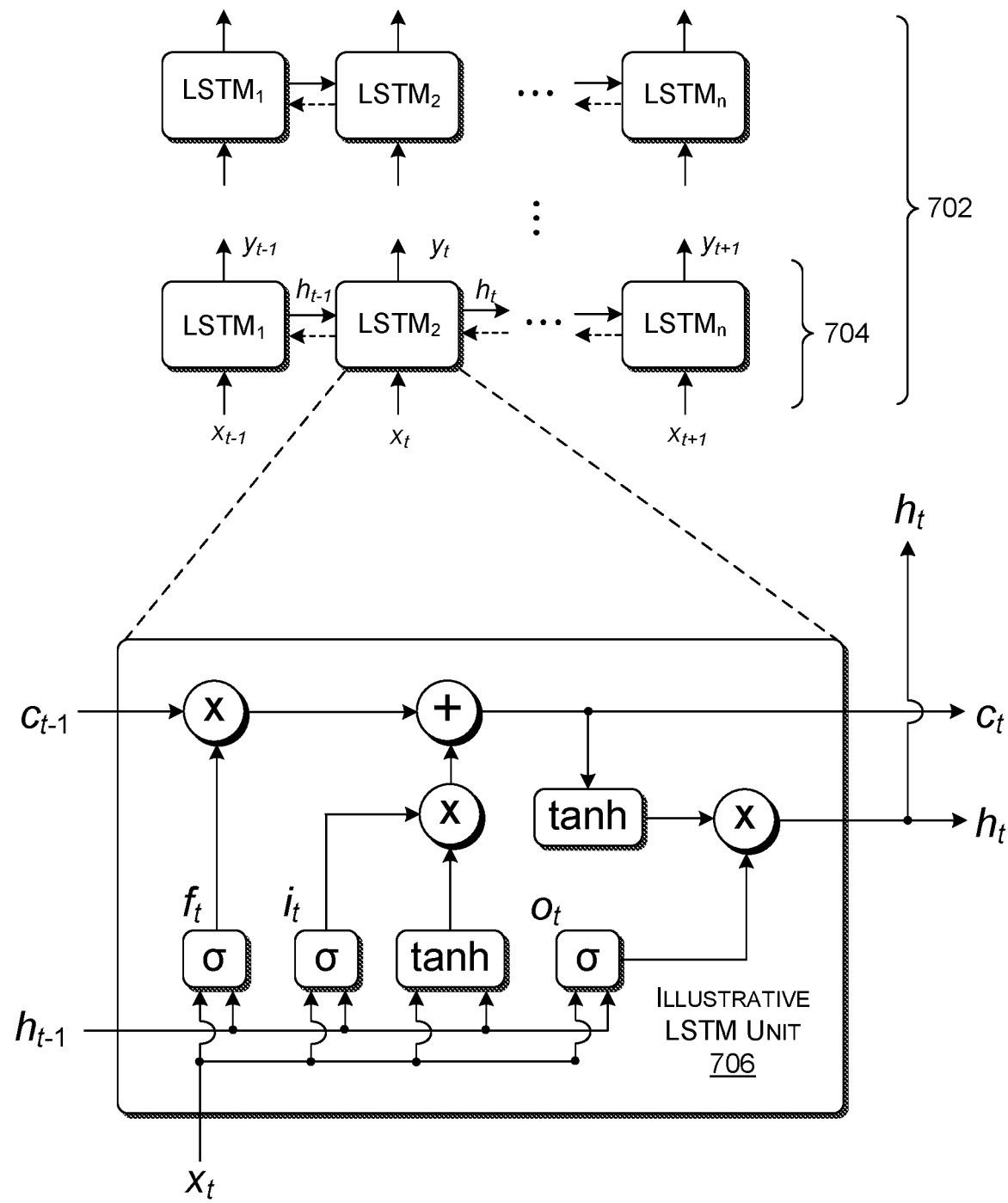
FIG. 7 shows an illustrative and non-limiting Recurrent Neural Network (RNN) component that can be used by the training system of FIG. 1.

Advancing to FIG. 7, this figure shows an illustrative n-layer RNN component 702 that can be used to implement any of the RNN components shown in FIG. 4. Each layer of the RNN component 702, such as illustrative layer 704, includes a series of RNN units, shown for in "unrolled" form in FIG. 7 for purposes of explanation. In this merely illustrative example, each RNN unit corresponds to a Long Short-Term Memory (LSTM) memory unit. In other case, the RNN units can correspond to Gated Recurrent Units (GRUs), etc. (In actuality, an RNN component implements each RNN layer using a single body of code; the unrolled form shown in FIG. 7 represents the operation of that single body of code at different instances of time t, with respect to different input values $x_t$.)

In a fed-forward RNN component, each RNN unit accepts a first input corresponding to a hidden state vector $h_{t-1}$ from a preceding RNN unit (if any), and a second input corresponding to an input vector $x_t$ for time instance t. For example, in the context of the first embedding table 402, each input vector $x_t$ corresponds to an embedding vector associated with a particular word in an input training example. The RNN units perform cell-specific processing on these input vectors to generate a hidden state vector $h_t$ and an output vector $y_t$. In one merely illustrative case, the RNN units compute $h_t$ and $y_t$ using the following equations:

$$h_t = \sigma(W_{xh} x_t + W_{hh} h_{t-1} + b_h) \qquad (9),$$

$$y_t = \sigma(W_{hy} h_t + b_y) \qquad (10).$$

The symbol σ represents a logistic sigmoid function. The various weighting terms (W) and bias terms (b) represent machine-learned parameter values. In other cases, each layer of the RNN units can also, or alternatively, feed hidden state information in the "backward" (right-to-left) direction. FIG. 7 illustrates the possible backward movement of hidden state information using dashed-lined arrows.

FIG. 7 shows also shows the architecture of one of the LSTM units, labeled as LSTM unit 706 in FIG. 7. The LSTM unit 706 includes an input gate, an output gate, a forget gate, and a cell. In one non-limiting example, the LSTM unit 706 processes signals in a manner specified by the following equations:

$$i_t = \sigma(W_i x_t + U_i h_{t-1} + b_i) \qquad (11)$$

$$f_t = \sigma(W_f x_t + U_f h_{t-1} + b_f) \qquad (12)$$

$$c_t = f_t c_{t-1} + i_t \tanh(W_c x_t + U_c h_{t-1} + b_c) \qquad (13)$$

$$o_t = \sigma(W_o x_t + U_o h_{t-1} + b_o) \tag{14}$$

$$h_t = o_t \tanh(c_t) \tag{15}.$$

In these equations, symbols i, o, f, and c represent vectors associated with the input gate, the output gate, the forget gate, and the cell, respectively. h represents a hidden state vector associated with the hidden state. σ represents a logistic sigmoid function. The various weighting terms (W, U) and bias terms (b) represent machine-learned parameter values, with subscripts associated with the above-defined symbols.

Figure 6:
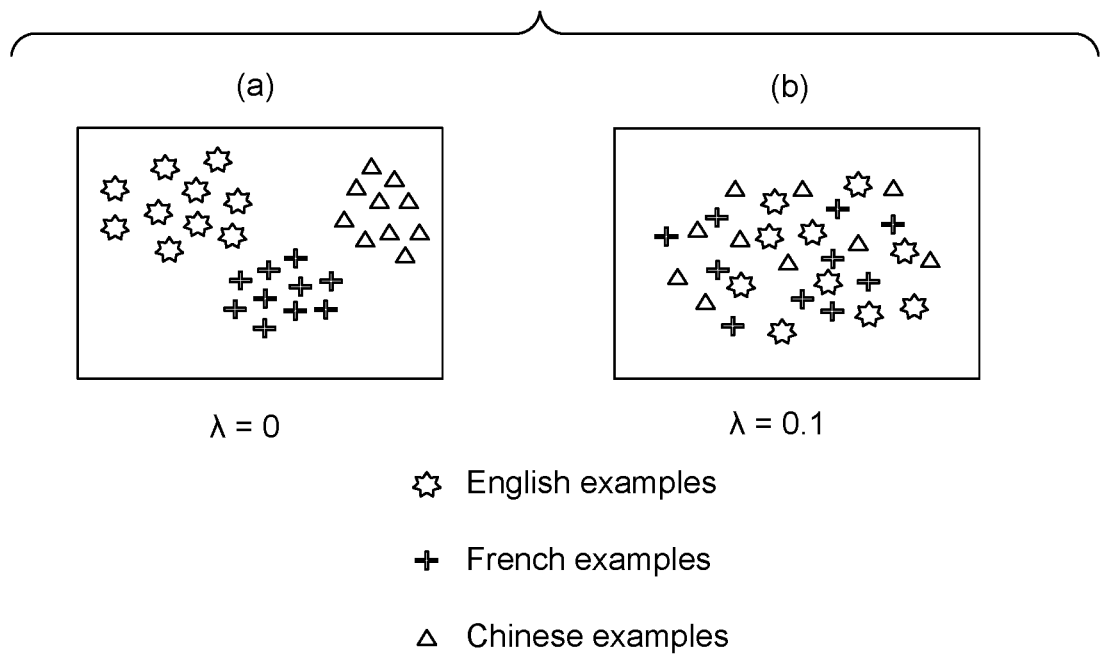
FIG. 6 shows two plots which demonstrate the role of the discriminator component in the training operation performed by the training system of FIG. 1.

Moving back in the figures to FIG. 6, this figure shows the performance of the training system 102 of FIG. 1 for two settings of the scaling factor λ used in the loss function of Equation (5). Different techniques can be used to generate these kinds of visualizations of high-dimensional data, such as the t-SNE technique described in van der Maaten, et al., in "Visualizing Data Using t-SNE," in *Journal of Machine Learning Research*, November 2008, pp. 2579-2605, etc.

In case (a), the scaling parameter λ is set to zero. As a result, the discriminator component 106 plays no role in the learning performed by the training system 102 of FIG. 1. In this situation, the training component 108 yields representations that form clusters associated with the respective input languages, e.g., by forming a first cluster associated with English-language input training examples, a second cluster associated with French-language input training examples, and a third cluster associated with Chinese-language input training examples. In other words, the representations in this case are not truly agnostic with respect to language, as the language model component 104 trivially learns to distinguish between input training examples in different languages.

In case (b), the scaling parameter λ is set to 0.1. In this situation, the training component 108 yields language-agnostic representations that merge the training examples associated with different input languages together. The constraint posed by the discriminator component 106 achieves this effect. However, by increasing λ beyond a certain point, the training component 108 will begin to produce inferior results; in this situation, the discriminator component 106 begins to interfere with the ability of the language model component 104 to learn the patterns associated with individual languages.

Note, with reference to plot (b) of FIG. 6, that individual points in the plot that are close together likely correspond to similar concepts extracted from the input training examples. But the training system 102 achieves this effect in automatic fashion without the use of a parallel corpus of training examples. This aspect of the training system 102 facilitates the generation of the UEC 112. It also improves the ability of the training system 102 to extract similar concepts from different training examples in different languages. In many cases, there is no word-for-word equivalent between concepts in different languages; by not insisting on the use of a parallel corpus, the training system 102 is not hampered by this complication.

B. Illustrative Processes

FIGS. 8-11 show processes that explain the operation of the training systems described in Section A in flowchart form. Since the principles underlying the operation of the training systems have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 8 shows a process 802 for generating a task-specific machine-trained component. In block 804, a second computer-implemented ("downstream") training system 204 receives a universal encoder component (UEC) 112 that is produced by a first computer-implemented training system 102. In block 806, the second computer-implemented training system 204 generates a task-specific machine-trained component 206 based on a set of input training examples expressed in at least one natural language. The second training system 204 uses the UEC 112 to convert each input training example into a language-agnostic representation of the input training example. The task-specific machine-trained component 206, once trained, provides a computer-implemented tool for mapping an input document, expressed in an input natural language, into an output result. The mapping operation also applies to a case in which the input natural language of the input document is not among the at least one natural language that was used to produce the task-specific machine-trained component 206. The second training system 204 corresponds to a different training system or a same training system as the first training system 102.

Figure 9:
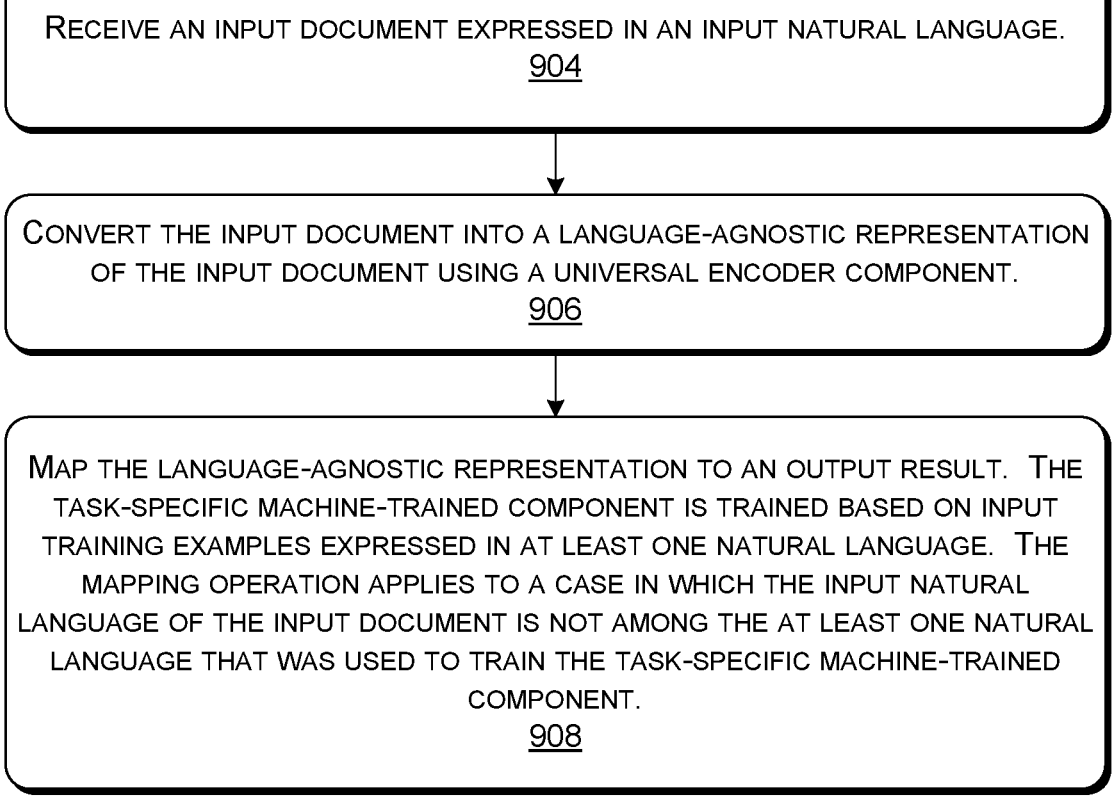
FIG. 9 shows a process for applying the task-specific machine-trained component produced by the process of FIG. 8.

FIG. 9 shows a process 902 for applying the UEC 112, e.g., by the task-specific machine-trained component 206 of FIG. 2. In block 904, the task-specific machine-trained component 206 receives an input document expressed in an input natural language. In block 906, the task-specific machine-trained component 206 converts the input document into a language-agnostic representation of the input document using the UEC 112. In block 908, the task-specific machine-trained component 206 maps the language-agnostic representation into an output result. The task-specific machine-trained component 206 is trained based on input training examples expressed in at least one natural language. Block 908 applies to a case in which the input natural language of the input document is not among the natural language(s) that were used to train the task-specific machine-trained component 206.

Figure 11:
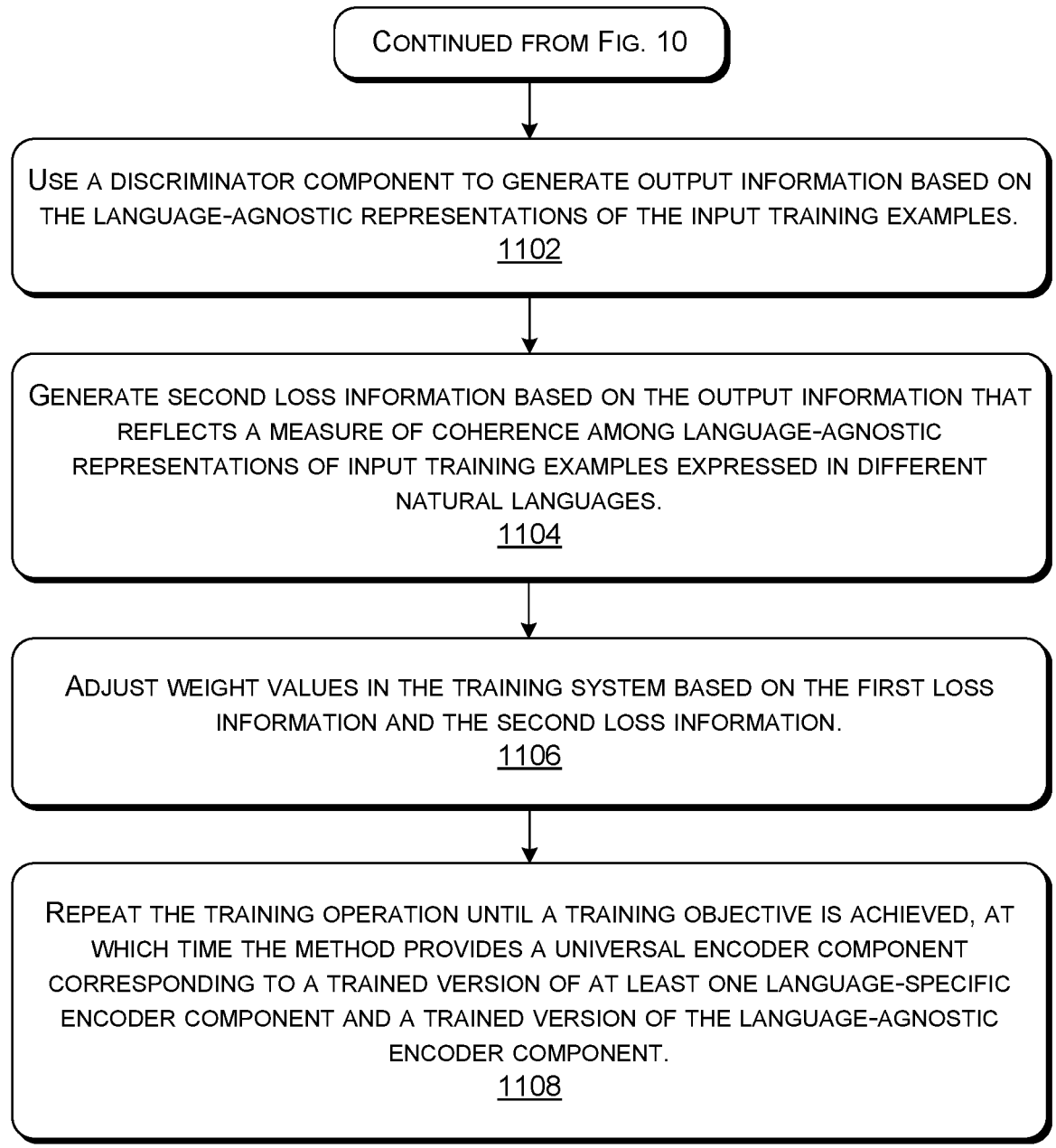

FIGS. 10-11 together show a process 1002 for producing the UEC 112 in a training system 102. In block 1004, the training system 102 uses plural language-specific encoder components (114, 116, 118) to convert input training examples expressed in different natural languages into respective language-specific representations of the input training examples. In block 1006, the training system 102 uses a language-agnostic encoder component (LAEC) 120 to convert each language-specific representation into a language-agnostic representation. In block 1008, for each natural language associated with the input training examples, the training system 102 uses a language-specific decoder component (LSDC) 122 to convert the language-agnostic representation, together with rule information which characterizes syntactic principles underlying the natural language, into a language-specific decoded representation. In block 1010, for each natural language associated with the input training examples, the training system 102 uses a language-specific output component (e.g., language-specific output component 126) to convert the language-specific decoded representation into an output result expressed in the natural language. Each language-specific encoder component, the LAEC 120, the LSDC 122, and each language-specific output component correspond to parts of a language model component 104. In block 1012, the training system 102 generates first loss information based on a measure of the predictive accuracy of the language model component 104.

Advancing to FIG. 11, in block 1102, the training system 102 uses a discriminator component 106 to generate output information based on the language-agnostic representations of the input training examples produced in block 1006. In block 1104, the training system 102 generates second loss information based on the output information that reflects a measure of coherence among the language-agnostic representations of input training examples expressed in different natural languages. In block 1106, the training system 102 adjusts weight values in the training system 102 based on the first loss information and the second loss information. In block 1108, the training system 102 repeats the above-described training operation until a training objective is achieved, at which time the method provides a universal encoder component (UEC) 112, corresponding to a trained version of at least one language-specific encoder component and a trained version of the LAEC 120.

C. Representative Computing Functionality

Figure 12:
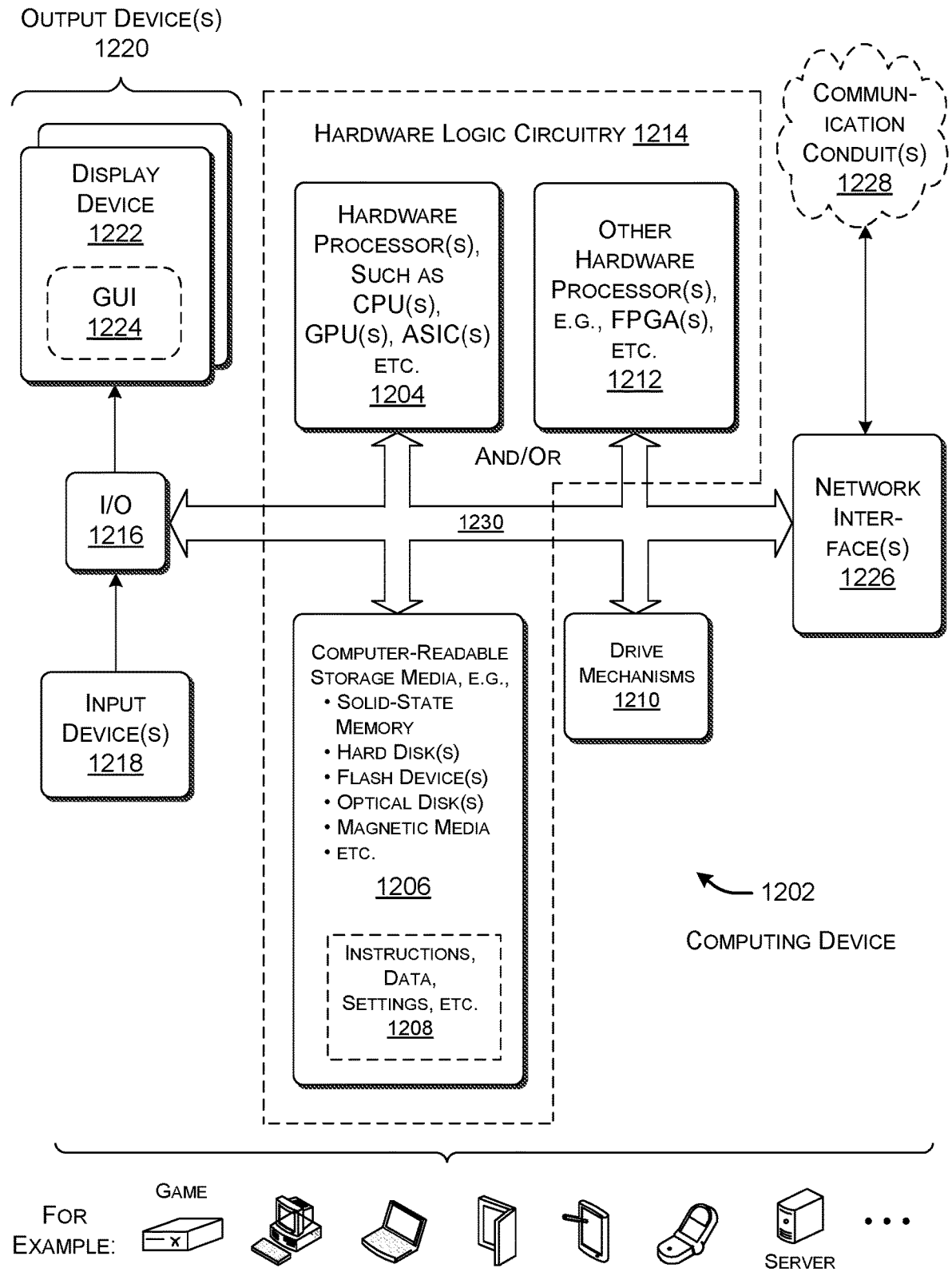
FIG. 12 shows an illustrative type of computing device that can be used to implement any aspect of the features shown in the foregoing drawings.

FIG. 12 shows a computing device 1202 that can be used to implement any aspect of the mechanisms set forth in the above-described figures. For instance, with reference to FIG. 3, the type of computing device 1202 shown in FIG. 12 can be used to implement any of the server(s) 306 and/or the user computing device 304. In all cases, the computing device 1202 represents a physical and tangible processing mechanism.

The computing device 1202 can include one or more hardware processors 1204. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1202 can also include computer-readable storage media 1206, corresponding to one or more computer-readable media hardware units. The computer-readable storage media 1206 retains any kind of information 1208, such as machine-readable instructions, settings, data, etc. Without limitation, for instance, the computer-readable storage media 1206 may include one or more solid-state devices, one or more magnetic hard disks, one or more optical disks, magnetic tape, and so on. Any instance of the computer-readable storage media 1206 can use any technology for storing and retrieving information. Further, any instance of the computer-readable storage media 1206 may represent a fixed or removable component of the computing device 1202. Further, any instance of the computer-readable storage media 1206 may provide volatile or non-volatile retention of information.

The computing device 1202 can utilize any instance of the computer-readable storage media 1206 in different ways. For example, any instance of the computer-readable storage media 1206 may represent a hardware memory unit (such as Random Access Memory (RAM)) for storing transient information during execution of a program by the computing device 1202, and/or a hardware storage unit (such as a hard disk) for retaining/archiving information on a more permanent basis. In the latter case, the computing device 1202 also includes one or more drive mechanisms 1210 (such as a hard drive mechanism) for storing and retrieving information from an instance of the computer-readable storage media 1206.

The computing device 1202 may perform any of the functions described above when the hardware processor(s) 1204 carry out computer-readable instructions stored in any instance of the computer-readable storage media 1206. For instance, the computing device 1202 may carry out computer-readable instructions to perform each block of the processes described in Section B.

Alternatively, or in addition, the computing device 1202 may rely on one or more other hardware processors 1212 to perform operations using a task-specific collection of logic gates. For instance, the other hardware processor(s) 1212 may include a fixed configuration of hardware logic gates, e.g., that are created and set at the time of manufacture, and thereafter unalterable. Alternatively, or in addition, the other hardware processor(s) 1212 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 12 generally indicates that hardware logic circuitry 1214 includes any combination of the hardware processor(s) 1204, the computer-readable storage media 1206, and/or the other hardware processor(s) 1212. That is, the computing device 1202 can employ any combination of the hardware processor(s) 1204 that execute machine-readable instructions provided in the computer-readable storage media 1206, and/or one or more other hardware processor(s) 1212 that perform operations using a fixed and/or programmable collection of hardware logic gates. More generally stated, the hardware logic circuitry 1214 corresponds to one or more hardware logic components of any type(s) that perform operations based on logic stored in and/or otherwise embodied in the hardware logic component(s).

In some cases (e.g., in the case in which the computing device 1202 represents a user computing device), the computing device 1202 also includes an input/output interface 1216 for receiving various inputs (via input devices 1218), and for providing various outputs (via output devices 1220). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1222 and an associated graphical user interface presentation (GUI) 1224. The display device 1222 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1202 can also include one or more network interfaces 1226 for exchanging data with other devices via one or more communication conduits 1228. One or more communication buses 1230 communicatively couple the above-described components together.

The communication conduit(s) 1228 can be implemented in any manner, e.g., by a local area computer network, a wide area computer network (e.g., the Internet), point-to-point connections, etc., or any combination thereof. The communication conduit(s) 1228 can include any combination of hardwired links, wireless links, routers, gateway functionality, name servers, etc., governed by any protocol or combination of protocols.

FIG. 12 shows the computing device 1202 as being composed of a discrete collection of separate units. In some cases, the collection of units may correspond to discrete hardware units provided in a computing device chassis having any form factor. FIG. 12 shows illustrative form factors in its bottom portion. In other cases, the computing device 1202 can include a hardware logic component that integrates the functions of two or more of the units shown in FIG. 1. For instance, the computing device 1202 can include a system on a chip (SoC or SOC), corresponding to an integrated circuit that combines the functions of two or more of the units shown in FIG. 12.

The following summary provides a non-exhaustive set of illustrative aspects of the technology set forth herein.

According to a first aspect, one or more computing devices are described for generating a task-specific machine-trained component. The computing device(s) include one or more hardware processors that execute operations based on machine-readable instructions stored in a memory and/or based on logic embodied in a task-specific collection of logic gates. The operations include: receiving a universal encoder component that is produced by a first computer-implemented training system; and using a second computer-implemented training system to generate a task-specific machine-trained component based on a set of input training examples expressed in at least one natural language, the second training system using the universal encoder component to convert each input training example into a language-agnostic representation of the input training example. The task-specific machine-trained component, once trained, provides a computer-implemented tool for mapping an input document, expressed in an input natural language, into an output result, the mapping operation also applying to a case in which the input natural language of the input document is not among the at least one natural language that was used to train the task-specific machine-trained component. The second training system corresponds to a different training system or a same training system as the first training system.

According to a second aspect, the operations further include producing plural task-specific machine-trained components using the universal encoder component that perform plural respective different tasks, the universal encoder component also being agnostic with respect to task.

According to a third aspect, the universal encoder component uses a machine-trained model for mapping linguistic content expressed in a given natural language into a language-agnostic representation of the linguistic content.

According to a fourth aspect, the first training system produces the universal encoder component using a generative adversarial network (GAN).

According to a fifth aspect, the first training system generates the universal encoder component by simultaneously training a language model component and a discriminator component, and wherein the first training system generates the universal encoder component based on a training objective that takes into consideration at least: loss information based on a measure of predictive accuracy of the language model component; and loss information based on a measure of coherence among language-agnostic representations of input training examples expressed in different natural languages, the measure of coherence being based on output information generated by the discriminator component.

According to a sixth aspect, dependent on the fifth aspect, the measure of coherence is generated by computing, for each of a plurality of pairs of language-agnostic representations, a distance between a first language-agnostic representation associated with an input training example in a first natural language, and a second language-agnostic representation associated with an input training example expressed in a second natural language.

According to a seventh aspect, dependent on the sixth aspect, the distance is a Wasserstein distance.

According to an eighth aspect, a computer-readable storage medium for storing computer-readable instructions is described, the computer-readable instructions, when executed by one or more hardware processors, providing a task-specific machine-trained component. The task-specific machine-trained component performs operations of: receiving an input document expressed in an input natural language; converting the input document into a language-agnostic representation of the input document using a universal encoder component; and mapping the language-agnostic representation to an output result. The task-specific machine-trained component is trained based on input training examples expressed in at least one natural language, the mapping operation applying to a case in which the input natural language of the input document is not among the at least one natural language that was used to train the task-specific machine-trained component.

According to a ninth aspect, dependent on the eighth aspect, the universal encoder component is also agnostic with respect to a task performed by the task-specific machine-trained component.

According to a tenth aspect, dependent on the eighth aspect, the universal encoder component uses a machine-trained model for mapping linguistic content in the input document into a language-agnostic representation of the linguistic content.

According to an eleventh aspect, the universal encoder component is produced by a training system that uses a generative adversarial network (GAN).

According to a twelfth aspect, dependent on the eighth aspect, the universal encoder component is produced by a training system by simultaneously training a language model component and a discriminator component. The training system generates the universal component based on a training objective that takes into consideration at least: loss information based on a measure of predictive accuracy of the language model component; and loss information based on a measure of coherence among language-agnostic representations of input training examples expressed in different natural languages, the measure of coherence being based on output information generated by the discriminator component.

According to a thirteenth aspect, a method is described, implemented by one or more computing devices, for performing machine-training in a training system. The method includes, in a training operation: using plural language-specific encoder components to convert input training examples expressed in different natural languages into respective language- specific representations of the input training examples; and using a language-agnostic encoder component to convert each language-specific representation into a language-agnostic representation. The training operation further includes, for each natural language associated with the input training examples: using a language-specific decoder component to convert the language-agnostic representation, together with rule information which characterizes syntactic principles underlying the natural language, into a language-specific decoded representation; and using a language-specific output component to convert the language-specific decoded representation into an output result expressed in the natural language. Each language-specific encoder component, the language-agnostic encoder component, the language-specific decoder component, and each language-specific output component correspond to parts of a language model component. The training operation further includes: generating first loss information based on a measure of predictive accuracy of the language model component; using a discriminator component to generate output information based on language-agnostic representations of the input training examples; generating second loss information, based on the output information, that reflects a measure of coherence among the language-agnostic representations of input training examples expressed in different natural languages; and adjusting weight values in the training system based on the first loss information and the second loss information. The method further includes repeating the training operation until a training objective is achieved, at which time the method provides a universal encoder component corresponding to a trained version of at least one language-specific encoder component and a trained version of the language-agnostic encoder component.

According to a fourteenth aspect, dependent on the thirteenth aspect, the language model component and the discriminator component are each implemented using one or more machine-trained models.

According to a fifteenth aspect, dependent on the fourteenth aspect, at least one machine-trained model used by the method is a neural network.

According to a sixteenth aspect, dependent on the fifteenth aspect, at least one neural network used by the method is a recurrent neural network (RNN).

According to a seventeenth aspect, dependent on the thirteenth aspect, the measure of coherence is generated by computing, for each of a plurality of pairs of language-agnostic representations, a distance between a first language-agnostic representation associated with an input training example expressed in a first natural language, and a second language-agnostic representation associated with an input training example expressed in a second natural language.

According to an eighteenth aspect, dependent on the seventeenth aspect, the distance is a Wasserstein distance.

According to a nineteenth aspect, dependent on the thirteenth aspect, the training system performs its training using a generative adversarial network (GAN).

According to a twentieth aspect, dependent on the thirteenth aspect, the method further includes, in a further training operation: using the universal encoder component to generate a task-specific machine-trained component based on a set of input training examples expressed in at least one natural language. The task-specific machine-trained component, once trained, provides a computer-implemented tool for mapping an input document, expressed in an input natural language, into an output result. The mapping also applies to a case in which the input natural language of the input document tis not among the at least one natural language that was used to produce the task-specific machine-trained component.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for generating a task-specific machine-trained component, comprising:
   one or more hardware processors that execute operations based on machine-readable instructions stored in a memory and/or based on logic embodied in a task-specific collection of logic gates, the operations including:
   receiving a universal encoder component that has been produced by a first computer-implemented training system; and
   using a second computer-implemented training system to generate, by training, a task-specific machine-trained component, following production of the universal encoder component by the first training system, based on a set of input training examples expressed in at least one natural language, the second training system using the trained universal encoder component to convert each input training example into a language-agnostic representation of the input training example,
   the task-specific machine-trained component, once trained, providing a computer-implemented tool for mapping an input document, expressed in a particular input natural language, into an output result, said mapping applying to a case in which the particular input natural language of the input document is not among said at least one natural language that was used to train the task-specific machine-trained component, but wherein the universal encoder component has been trained to convert the input document expressed in the particular input natural language into a linguistic-agnostic representation of the input document,
   the second training system corresponding to a different training system or a same training system as the first training system, the first training system and the second training system being implemented by said one or more hardware processors.

2. The one or more computing devices of claim 1, wherein the operations further include producing plural task-specific machine-trained components using the universal encoder component that perform plural respective different tasks, the universal encoder component also being agnostic with respect to task.

3. The one or more computing devices of claim 1, wherein the first training system produces the universal encoder component using a generative adversarial network (GAN).

4. The one or more computing devices of claim 1, wherein the first training system generates the universal encoder component by simultaneously training a language model component and a discriminator component, and wherein the first training system generates the universal encoder component based on a training objective that takes into consideration at least:
   loss information based on a measure of predictive accuracy of the language model component; and
   loss information based on a measure of coherence among three or more distributions of language-agnostic representations of input training examples expressed in different natural languages, said measure of coherence being based on output information generated by the discriminator component.

5. The one or more computing devices of claim 4, wherein the measure of coherence reflects a combined measure of coherence among a plurality of pairings of distributions, each pairing of distributions including a first distribution of language-agnostic representations associated with a first natural language represented by the input training examples used by the first training system, and a second distribution of language-agnostic representations associated with a second natural language represented by the input training examples used by the first training system.

6. The one or more computing devices of claim 5, wherein the combined measure of coherence is generated by computing, for each particular pairing of distributions, a distance between the particular pairing of distributions, and wherein the combined measure of coherence is based on a combination of distances associated with different respective pairings of distributions.

7. The one or more computing devices of claim 4, wherein a particular set of input training examples in the different natural languages that are fed together to the first training system do not represent translations of a same underlying content into the different natural languages.

8. A computer-readable storage medium for storing computer-readable instructions, the computer-readable instructions, when executed by one or more hardware processors, providing a task-specific machine-trained component that performs operations of:
   receiving an input document expressed in a particular input natural language;
   converting the input document into a language-agnostic representation of the input document using a universal encoder component; and
   mapping the language-agnostic representation to an output result,
   the task-specific machine-trained component having been trained based on input training examples expressed in at least one natural language,
   the universal encoder component being trained in a first machine-training process, and the task-specific machine-trained component being trained in a second machine-training process, and
   the task-specific machine-trained component incorporating the universal encoder component that is trained in the first machine-training process,
   wherein the universal encoder component is produced by the first machine-training process by simultaneously training a language model component and a discriminator component, and wherein the first machine-training process generates the universal component based on a training objective that takes into consideration at least:
   loss information based on a measure of predictive accuracy of the language model component; and
   loss information based on a measure of coherence among three or more distributions of language-agnostic representations of input training examples expressed in different natural languages, said measure of coherence being based on output information generated by the discriminator component.

9. The computer-readable storage medium of claim 8, wherein the universal encoder component is also agnostic with respect to a task performed by the task-specific machine-trained component.

10. The computer-readable storage medium of claim 8, wherein the measure of coherence reflects a combined measure of coherence among a plurality of pairings of distributions, each pairing of distributions including a first distribution of language agnostic representations associated with a first natural language represented by the input training examples used by the first machine-training process, and a second distribution of language agnostic representations associated with a second natural language represented by the input training examples used by the first machine-training process.

11. The computer-readable storage medium of claim 10, wherein the combined measure of coherence is generated by computing, for each particular pairing of distributions, a distance between the particular pairing of distributions, and wherein the combined measure of coherence is based on a combination of distances associated with different respective pairings of distributions.

12. A method, implemented by one or more computing devices, for performing machine-training in a training system, comprising:
   in a training operation:
      using plural language-specific encoder components to convert input training examples expressed in respective different natural languages into respective language-specific representations of the input training examples;
      using a language-agnostic encoder component to convert each language-specific representation into a language-agnostic representation;
      for a given natural language associated with a given input training example expressed in the given natural language:
         using a language-specific decoder component to convert a language-agnostic representation of the given input training example, together with rule information which characterizes syntactic principles underlying the given natural language and which is separate from the language-agnostic representation of the given input training example, into a language-specific decoded representation of the given input training example; and using a language-specific output component to convert the language-specific decoded representation into an output result expressed in the given natural language, each language-specific encoder component, the language-agnostic encoder component, each language-specific decoder component, and each language-specific output component corresponding to parts of a language model component;

generating first loss information based on a measure of predictive accuracy of the language model component;

using a discriminator component to generate output information based on language-agnostic representations of the input training examples;

generating second loss information, based on the output information, that reflects a measure of coherence among distributions of the language-agnostic representations of the input training examples expressed in different natural languages; and adjusting weight values in the training system based on the first loss information and the second loss information; and repeating the training operation until a training objective is achieved, at which time the method provides a universal encoder component corresponding to a trained version of at least one language-specific encoder component and a trained version of the language-agnostic encoder component.

13. The method of claim 12, wherein the language model component and the discriminator component are each implemented using one or more machine-trained models.

14. The method of claim 12, wherein the measure of coherence reflects a combined measure of coherence among a plurality of pairings of distributions, each pairing of distributions including a first distribution of language-agnostic representations associated with a first natural language represented by the input training examples, and a second distribution of language-agnostic representations associated with a second natural language represented by the input training examples.

15. The method of claim 14, wherein the combined measure of coherence is generated by computing, for each particular pairing of distributions, a distance between the particular pairing of distributions, and wherein the combined measure of coherence is based on a combination of distances associated with different respective pairings of distributions.

16. The method of claim 12, wherein the distance is measure of coherence is based on a Wasserstein distance measure.

17. The method of claim 12, further comprising, in a further training operation:

using the universal encoder component to generate a task-specific machine-trained component based on a set of input training examples expressed in at least one natural language, the task-specific machine-trained component, once trained, providing a computer-implemented tool for mapping an input document, expressed in a particular input natural language, into an output result, said mapping applying to a case in which the particular input natural language of the input document is not among said at least one natural language that was used to produce the task-specific machine-trained component.

18. The method of claim 12, wherein a particular set of input training examples in the different natural languages do not represent translations of a same underlying content into the different natural languages.

\* \* \* \* \*